(No Model.)
S. W. CATELY.
THILL SUPPORT.
No. 594,342. Patented Nov. 23, 1897.
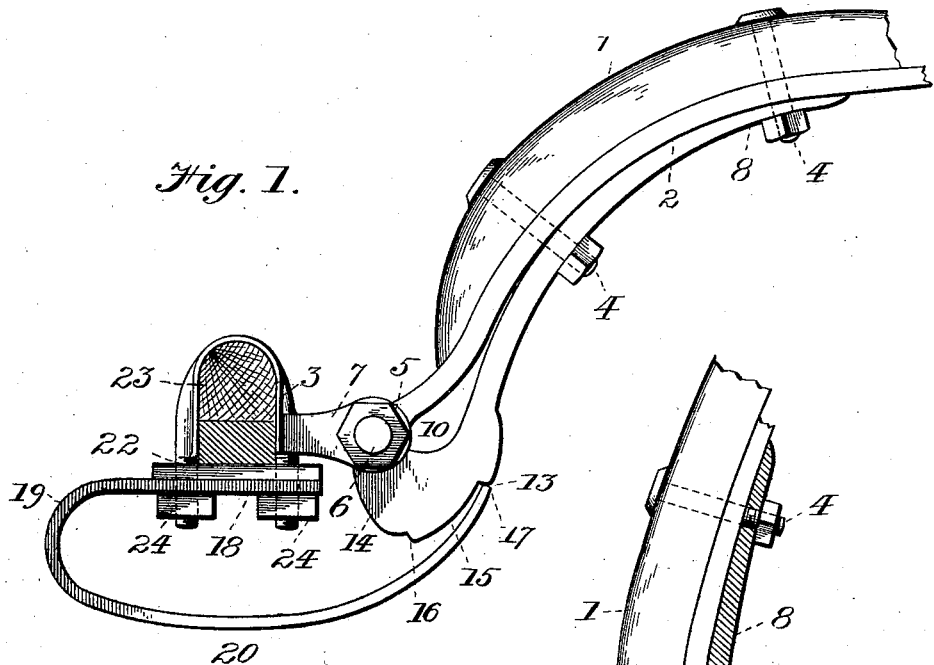
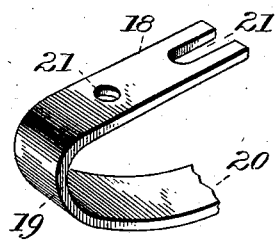
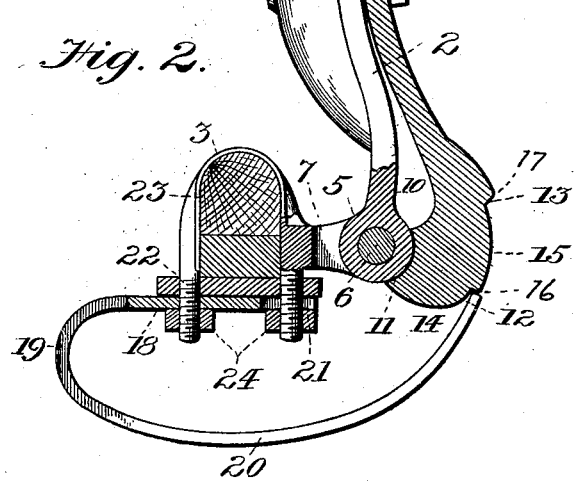
Witnesses
Inventor
Shepard W. Cately,
by M. D. Peck
his Attorney

UNITED STATES PATENT OFFICE.

SHEPARD W. CATELY, OF CORTLAND, NEW YORK, ASSIGNOR TO ALICE M. ETTLING, OF SAME PLACE.

THILL-SUPPORT.

SPECIFICATION forming part of Letters Patent No. 594,342, dated November 23, 1897.

Application filed April 14, 1897. Serial No. 632,138. (No model.)

*To all whom it may concern:*

Be it known that I, SHEPARD W. CATELY, a citizen of the United States, residing at Cortland, in the county of Cortland and State of New York, have invented certain new and useful Improvements in Thill-Holders and Antirattlers; and I do hereby declare the following to be a full, clear, and exact description of the invention, such as will enable others skilled in the art to which it appertains to make and use the same, reference being had to the accompanying drawings, which form part of this specification.

My invention relates to that class of thill-couplings in connection with which springs are employed to engage devices applied to the under side of the thills and to operate to hold the latter elevated and also serve to reduce the tendency of couplings to rattle; and the invention consists in the peculiarities of construction and arrangement of parts composing the device hereinafter described, and more particularly pointed out in the claims.

The object of the invention is to provide a supporting and antirattling means of a thill-coupling which will have all the advantages and none of the disadvantages of those of the above-named type previously proposed and be entirely practical in every respect, in that it is of more simple construction, cheaper and more durable in character, and is capable of being quickly and easily applied to the ordinary and commonly used thill-coupling, and requires no alteration whatever in its application to the coupling and will most efficiently support the thill in either of two positions, and will not necessitate the application of manual pressure directly to the spring in order to permit the thill to be drawn down from its upper to a lower position.

Referring to the drawings, Figure 1 is a side view of a thill-coupling embodying my improvements, showing the thill supported with its outer end about one foot above the ground. Fig. 2 is a sectional view of the same with the thill supported in its highest position, and Fig. 3 is a detail perspective view of one end of the spring.

Like numerals refer to corresponding parts in each figure of the drawings.

The thill 1, thill-iron 2, and clip 3 are all of the usual construction, and the thill-iron is attached to the thill by bolts and nuts 4, as usual, and has the ordinary barrel 5 at its rear end, through which extends the ordinary bolt 6 for pivotally securing it between the forwardly-projecting flanges or walls 7 of the clip.

Attached to the under side of the thill-iron 2 by the previously-mentioned bolts and nuts 4 is a shoe 8, the rear end of the upper side of which is of such shape that for a slight distance it recedes from the thill-iron, as shown at 10, and then approaches the same and is formed at its extremity with the concavity 11, of a shape corresponding to and receiving the under surface of the barrel 5 of the thill-iron. The under surface of the rear end of the shoe is formed with the notches 12 and 13 and with convex surfaces 14 and 15, leading to the notches, respectively.

It will be observed that the forward walls of the notches or projections 16 and 17 are slightly beveled or inclined forward. This specific construction is an important and advantageous feature of my invention, inasmuch as it provides definite spaces and stops for the end of the supporting-spring hereinafter described, and the projections coöperate with said spring in most efficiently supporting the thills against accidental dropping, while at the same time the construction permits the thills to be lowered by pulling upon them.

It will be seen that the peculiar construction described has the advantage of that employing notches with abrupt forward walls without the disadvantage thereof incident to the necessity of disengaging the spring therefrom with the one hand in order to permit the thill to be lowered with the other hand, and also that while it may be lowered without applying pressure directly to the spring it is thoroughly efficient in holding the thill in either of its positions, which would not be true if, as has heretofore been proposed, the notches are not used, as the latter construction makes the spring very unreliable in holding the thill partly elevated and necessitates dependence upon the axle in order to hold the thill in its highest position.

The spring comprises the approximately horizontal part 18, the curved part 19, extending rearward and downward from said part 18, and the curved part 20, extending upward and forward from said part 19 to the shoe and terminating in a beveled end. The horizontal part 18 is formed with openings 21, through which the lower ends of the limbs 22 of the clip extend, and the forward one of said openings is elongated to adapt the spring for attachment to various sizes of clips, and said horizontal part lies immediately beneath the axle 23 of the vehicle and is held in place by the nuts 24, which secure the clip to said axle, as shown.

By attaching the spring beneath the axle and to the clip, as described, it is unnecessary to remove the thill in order to apply the spring, and by extending it rearward, downward, forward, and upward in a curved direction from the rear end of its horizontal part instead of directly to the thill-iron from the forward end of said horizontal part, as heretofore proposed, it is given maximum power and enabled efficiently to support the thill and positively to prevent rattling.

From the above description it will be clear that I do not claim, broadly, the use of a spring bearing against a shoe attached to the thill-iron or engaging a notch formed in the shoe for supporting the thill, but it will also be clear that my construction has all the advantages, not possessed by any one of the previous proposals, of simplicity, cheapness, durability, efficiency, and ready applicability to the ordinary construction of thill-iron and clip.

Having thus fully described my invention, what I claim as new is—

1. The combination with a thill-iron and clip, of a supporting-spring having a horizontal part secured to the lower ends of the clip and a curved part extending rearward, downward, forward and upward and terminating in a beveled end, a shoe attached to the under side of the thill-iron at one end and having a concavity to engage its barrel at the other end, the under side of the rear end of said shoe being formed with beveled notches to receive the forward extremity of said spring, whereby definite stops for the end of the spring are provided, and at the same time the beveled end of the spring is caused to yield to force applied to the thill and thereby enable the beveled notches of the shoe to slip over the end of the spring, as and for the purpose set forth.

2. The combination with a thill-iron and clip, of a supporting-spring having a horizontal part with an elongated opening adapting it to be secured at the lower end of different-sized clips, and a curved part extending rearward, downward, forward, and upward and terminating in a beveled end, a shoe attached to the under side of the thill-iron at one end and having a concavity to engage its barrel at its other end, the under side of the rear end of said shoe having beveled notches to receive the front beveled end of the spring, whereby a definite stop is provided which yields on applying force to the thill which causes the beveled notches and end of the spring to slip one over the other, as and for the purpose set forth.

In testimony whereof I affix my signature in presence of two witnesses.

SHEPARD W. CATELY.

Witnesses:
GEORGE V. CLARK,
R. C. TALBOT.